Jan. 3, 1967   H. L. GIWOSKY   3,295,811
MOUNT FOR RIFLESCOPE
Filed Nov. 18, 1964

INVENTOR
HARRY L. GIWOSKY
BY
Bayard H. Michael
ATTORNEY

United States Patent Office 3,295,811
Patented Jan. 3, 1967

3,295,811
MOUNT FOR RIFLESCOPE
Harry L. Giwosky, Milwaukee, Wis., assignor to Realist, Inc., Menomonee Falls, Wis., a corporation of Delaware
Filed Nov. 18, 1964, Ser. No. 412,027
9 Claims. (Cl. 248—229)

This invention relates to an assembly for mounting telescopic sights on a rifle.

Since there are occasions when removal of a "scope" from a rifle is desirable it has become customary to mount the scope in ring-like clamps which can be readily fixed on or removed from bases fixed to the receiver of the rifle. To avoid having to resight the scope it is important that the mount accurately locate the scope in its original position when the scope is remounted.

The principal object of this invention is to provide a rugged scope mount which allows easy removal and remounting of the scope in precisely the same alignment with respect to the rifle.

Other objects and advantages will be pointed out in, or be apparent from, the specification and claims, as will obvious modifications of the single embodiment shown in the drawings, in which:

Figure 1:
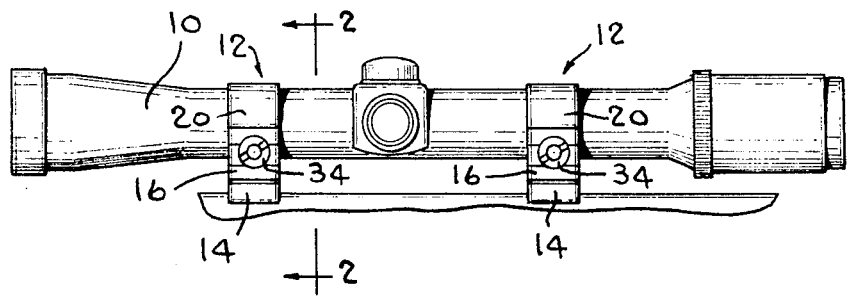
FIG. 1 is a side elevation of a telescope mounted on a rifle which is shown in part only.

The riflescope 10, as shown in FIG. 1, can be of any desired construction although it may be noted that the particular scope here shown includes a telescope tube which is a single extruded element having both ends enlarged, as claimed and more fully explained in my copending application Serial No. 436,414, filed February 15, 1965 as a continuation of a prior-filed application Serial No. 415,362, filed December 2, 1964, now abandoned, both applications being assigned to the assignee of this application. The telescope tube is customarily retained on the rifle by means of two mounts or mounting assemblies 12, 12. Each mounting assembly is comprised of a base 14 fixed by means of screws 15, 15 to the receiver of the rifle. The telescope tube is retained in a clamp, the lower portion of which is referred to as a block 16. The block has a generally semi-cylindrical saddle and on the upper left (FIG. 2) is provided with a protrusion or hook over which the hooked end 18 of the clamp ring 20 may be secured. The other end of the ring portion 20 is provided with a projecting ear 22 through which the clamping screws 24, 24 pass to tighten this end of the ring towards the block and firmly retain the scope tube 10.

This invention is principally concerned with the manner in which the block 16 is secured to the base 14. The base 14 is provided with a longitudinal notch 26 along its right side, as seen in the drawing. This notch is designed to receive the specially formed head 28 of bolt 30 which passes diagonally upward (FIG. 2) towards the left through the groove 32 in the base and thence through the cooperating hole in block 16 to project on the left side of the block. A suitable nut 34 is provided with a cross slot 36 for use of a coin or the like in tightening or loosening the nut.

The left side of the base 14 is provided with a longitudinal groove 38. The left side of the block is provided with a dependent portion 40 which has an inwardly projecting semi-cylindrical rib 42 which has a slightly larger radius than the groove 38. The upper right side of the base is provided with a horizontal flat portion 44 against which the flat right underside of the block may rest.

Figure 2:
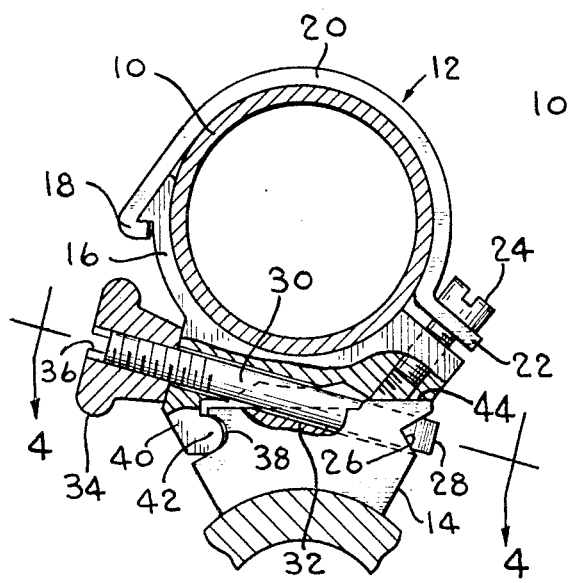
FIG. 2 is a section taken as indicated by line 2—2 on FIG. 1.
Figure 3:
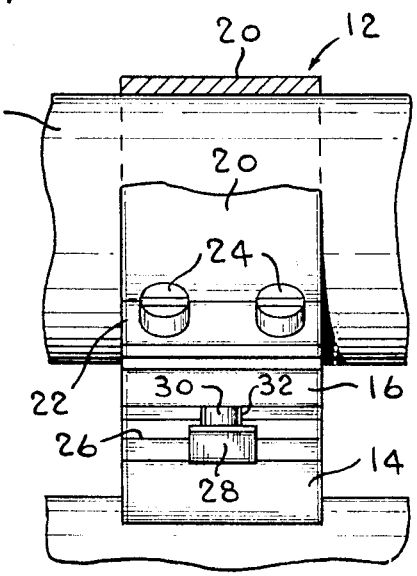
FIG. 3 is a view from the right of FIG. 2.
Figure 4:
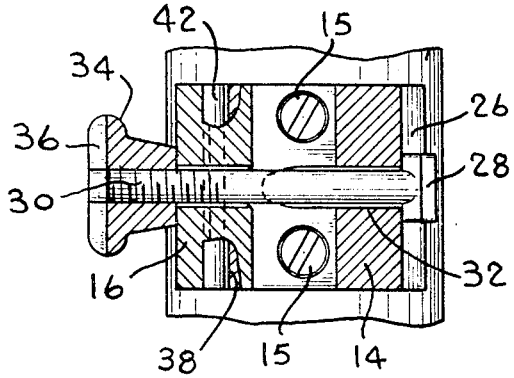
FIG. 4 is a section taken as indicated by line 4—4 on FIG. 2.
Figure 5:
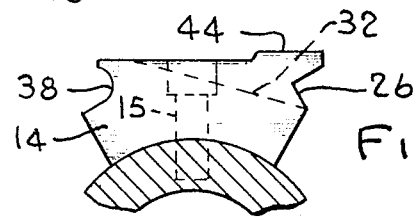
FIG. 5 is a view similar to FIG. 2 but shows the telescope and its clamp ring removed.
Figure 6:
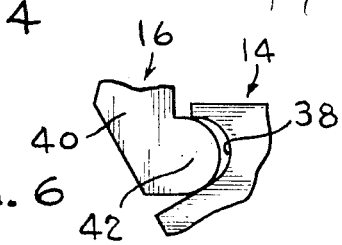
FIG. 6 is an enlarged fragmentary view showing the manner in which the rib and groove interfit.

It will be apparent on consideration of FIG. 2 that when the nut 34 is tightened the rib 42 will be drawn into the groove 38 and the block will tend to pivot in a clockwise direction about the rib and groove to draw the right side of the block down tight against the upper flat 44 of the base. Since the rib is slightly larger than the groove 38 the rib cannot bottom in the groove and, therefore, must always return to the same relative position with respect to the groove. If the rib were slightly undersize, then the positioning of the left side of the block with respect to the base would not be as accurate. The pivotal action allows the block to be drawn down tight on the right side against the flat and since this is a constant this point is accurately located. Therefore, this scope together with its clamp may be removed and replaced on the bases with the scope returning to precisely its original orientation with respect to the barrel of the rifle.

Upon consideration of FIG. 2 it will be apparent that the groove 38 could, for example, be replaced with a longitudinal notch and the rib could be pointed at a sharper angle than the opening of the notch so as to bottom in the very base of the notch. This, then would permit the pivoting action as well as accurately locating the "rib" vertically with respect to the base. The highest degree of accuracy would, however, be obtained with more or less a knife edge and this is not thought as durable or desirable as the present arrangement. The important fact is that the interfitting surfaces provide a precisely located pivot. It will be noted in either construction, namely that just described and that illustrated in the drawings, that the block and base have substantially point contact in a plane parallel to the plane of pivotal movement of the block or, in other words, in a plane normal to the direction of sliding movement between the block and base. This simple arrangement coupled with the bolt passing diagonally through both the base and the block to derive the desired horizontal and vertical force components on the block leads to an extremely simple yet highly accurate arrangement. It may be noted in passing that the longitudinal notch on the right side of the base serves merely to prevent the bolt head from sliding upwardly and that any configuration here as well as any bolt head configuration which can cooperate to prevent the bolt from sliding up vertically out of engagement with the base would be satisfactory.

In order to remove the scope it is merely necessary to back off the nut on each mount adequately to permit the rib to be slipped out of engagement with the groove on the left side of the base. The nut and bolt need not be removed from the block. To remount the scope it is only necessary to hook the headed bolt in the notch and tighten the nut while generally aligning the rib with the groove. As soon as the rib enters the groove it will properly seat itself and insure positive alignment.

Although but a single embodiment of the present invention has been illustrated and described, it will be apparent to those skilled in the art that various changes and modifications may be made therein without departing from the spirit of the invention or from the scope of the appended claims.

I claim:

1. A mounting assembly for a telescopic sight, comprising, a base adapted to be secured to a rifle, a telescope clamp including a block, interfitting non-planar surfaces on the block and base serving to locate the block vertically and horizontally with respect to the base, abutting surfaces on the block and base allowing relative sliding motion between the block and base as the interfitting surfaces are brought into engagement, and means connecting the block to the base and exerting a force on the block holding the interfitting surfaces in engagement and the abutting surfaces in engagement.

2. An assembly according to claim 1 in which the connecting means comprises a bolt passing diagonally through the block and base along a line passing above the interfitting surfaces on one side of the assembly and below the interfitting surfaces on the other side of the assembly.

3. An assembly according to claim 2 in which the interfitting surfaces determine a generally vertical plane of engagement and the abutting surfaces lie in a generally horizontal plane.

4. An assembly according to claim 1 in which the plane of engagement between the interfitting surfaces is generally normal to the plane of engagement of the abutting surfaces.

5. An assembly according to claim 4 in which the interfitting surfaces include a curved rib and a curved groove with the rib radius greater than the groove radius.

6. An assembly according to claim 5 in which the connecting means comprises a bolt passing through a groove in the base, said base being provided with a recess receiving the head of said bolt and preventing movement of the bolt out of the groove when the bolt is drawn tight.

7. A mounting assembly for a telescopic sight, comprising, a base, a telescope clamp including a block, abutting surfaces on the base and block defining three lines of contact positively positioning the block on the base horizontally and vertically, the abutting surfaces defining at least two of said lines of contact being non-planar, and a bolt passing through the base and block to maintain the three lines of contact.

8. A mounting assembly for a telescopic sight, comprising, a base, a telescope clamp including a block, first abutting surfaces on the base and block disposed to act as a pivot for the block, said first abutting surfaces having substantially point contact in a plane parallel to the plane of pivotal movement of said block, a bolt passing through the base and block drawing the surfaces together and tending to pivot the block towards the base, and second abutting surfaces limiting the pivotal movement of the block towards the base whereby the block is accurately located with respect to the base by reason of the abutment of the pivot surfaces and the limit surfaces.

9. A mounting assembly for a riflescope, comprising, a base member for attachment to a rifle, a scope clamp including a block member, a bolt passing through the base and block members diagonally with the bolt head engaging one member and the nut for the bolt engaging the other member, the nut and bolt acting when tightened to tend to slide the block transversely of the base, and abutting surfaces on the base and block having substantially point contact in a plane extending generally normal to the direction of sliding movement of said block with respect to said base and resisting the sliding tendency and locating the block horizontally and vertically with respect to the base.

References Cited by the Examiner

UNITED STATES PATENTS

| | | | |
|---|---|---|---|
| 2,803,880 | 8/1957 | Weaver | 33—50 |
| 2,857,675 | 10/1958 | Kesselring | 33—50 |
| 3,040,433 | 6/1962 | Heinzel | 33—50 |

FOREIGN PATENTS 339,083   7/1921   Germany.

CLAUDE A. LE ROY, *Primary Examiner.*

R. P. SEITTER, *Assistant Examiner.*